United States Patent
Figov

(10) Patent No.: US 11,430,488 B2
(45) Date of Patent: *Aug. 30, 2022

(54) SYSTEM AND METHOD FOR GENERATING A COMPRESSION INVARIANT MOTION TIMELINE

(71) Applicant: Verint Americas Inc., Alpharetta, GA (US)

(72) Inventor: Zvi Figov, Modiin (IL)

(73) Assignee: COGNYTE TECHNOLOGIES ISRAEL LTD., Pituach (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,954

(22) Filed: Jun. 17, 2020

(65) Prior Publication Data

US 2020/0342912 A1 Oct. 29, 2020

Related U.S. Application Data

(63) Continuation of application No. 16/290,559, filed on Mar. 1, 2019, now Pat. No. 10,726,877.

(60) Provisional application No. 62/768,262, filed on Nov. 16, 2018.

(51) Int. Cl.

| | |
|---|---|
| *G11B 27/34* | (2006.01) |
| *G06T 7/20* | (2017.01) |
| *G11B 27/30* | (2006.01) |
| *G11B 27/10* | (2006.01) |
| *G06V 20/40* | (2022.01) |
| *G06F 3/04842* | (2022.01) |

(52) U.S. Cl.
CPC ............ *G11B 27/34* (2013.01); *G06T 7/20* (2013.01); *G06V 20/46* (2022.01); *G11B 27/102* (2013.01); *G11B 27/3081* (2013.01); *G06F 3/04842* (2013.01); *G06T 2207/10016* (2013.01)

(58) Field of Classification Search
CPC ....... G11B 27/34; G06T 7/20; G06K 9/00744; G06F 3/04842
See application file for complete search history.

(56) References Cited

U.S. PATENT DOCUMENTS 10,726,877 B2 * 7/2020 Figov ................. G06T 7/20
2014/0184731 A1 7/2014 Bebbington

* cited by examiner

*Primary Examiner* — Girumsew Wendmagegn
(74) *Attorney, Agent, or Firm* — Anthony Jason Mirabito; ISUS Intellectual Property PLL

(57) ABSTRACT

The present invention generates a compression invariant motion timeline for a video. For each second in the video, the method uses an identification procedure to determine a stored key frame size, a frame counter, and an accumulated size of frames. The method then calculates and stores a motion value for the second using the stored key frame size, the frame counter, and the accumulated size of frames. The motion values for each second may be used to construct a timeline for the video.

20 Claims, 6 Drawing Sheets

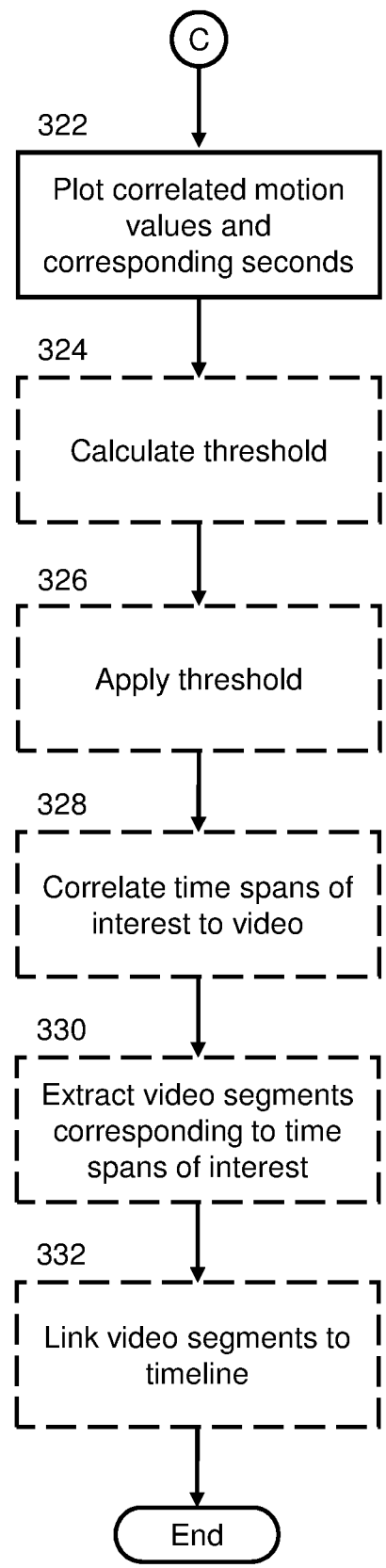

SYSTEM AND METHOD FOR GENERATING A COMPRESSION INVARIANT MOTION TIMELINE

CROSS-REFERENCE TO RELATED APPLICATIONS

This application is a continuation of U.S. patent application Ser. No. 16/290,559, filed Mar. 1, 2019, which application claims the benefit of prior-filed, U.S. Provisional Patent Application No. 62/768,262, filed on Nov. 16, 2018, the contents of which are incorporated herein by reference in their entireties.

BACKGROUND

The present disclosure is directed to a method for computer analysis, specifically a method for creating a timeline for a viewed video.

A video management system (VMS) usually shows the viewed video together with a timeline that represents motion, allowing quick access to segments of the video including motion. Many algorithms have been developed to create this timeline. Usually these algorithms will operate in the pixel domain which requires decompressing the video. To reduce the computation times, some algorithms operate in the compressed domain.

There are a number of methods that analyze the motion vectors of the compressed video. However, such methods can be slow and/or dependent on the video coder-decoder (codec) to utilize information in the compressed data. As a result, different codecs may require codec-specific algorithms. In addition, such methods may require significant processing equipment, time, and power for frame analysis. Codecs are improving in quality—compressing the most relevant information but at the cost of a higher complexity which requires more significant processing equipment. The resolution of the video is also constantly improving. Improving resolution from to 4K to 8K will also add to the processing time. Furthermore, newer video standards support a frame rate of 120, 240, or 300 frames per second. As a result, previous methods are not useable for rapid-paced or real-time applications, or applications analyzing high volumes of data from many simultaneous sources, data with different codec standards, or data with high compression or resolution values.

For example, a sports venue may have over 150 video cameras monitoring crowd and player safety over the six and a half hours for a major league baseball game, pre-game, and cleanup. Using conventional methods, analyzing the over 36 billion frames of footage that may be amassed would require an untenable amount of resources. Meaningful analysis results would be impossible in real time. Cameras installed at different times using different codecs would also require different programs for analysis.

There is an unmet need in the art for a method for rapidly generating an accurate, compression invariant video motion timeline.

SUMMARY

An exemplary embodiment of the present application is a method for generating a compression invariant motion timeline for a video. For each frame in a given second, the method reads the frame header and extracts the frame size and frame type. The frame type is selected from the group consisting of key frame and non-key frame. The method then stores the last key frame size if the frame is a key frame, or updates a frame counter and accumulates the size of frames if the frame is a non-key frame. For each second in the video, the method uses above procedure to identify the frames and then calculates and stores a motion value for the second using the stored key frame size, the frame counter, and the accumulated size of frames. The method then zeroes the frame counter and the accumulated size of frames. The method can then create a timeline using each motion value for each second.

Another exemplary embodiment of the present application is a system for generating a compression invariant motion timeline for a video. The system includes a processor and a non-transitory computer readable medium programmed with computer readable code that upon execution by the processor causes the processor to execute the above-mentioned method for generating a compression invariant motion timeline for a video.

Another exemplary embodiment of the present application is a non-transitory computer readable medium programmed with computer readable code that upon execution by a processor causes the processor to execute the above-mentioned method for generating a compression invariant motion timeline for a video.

The objects and advantages will appear more fully from the following detailed description made in conjunction with the accompanying drawings.

BRIEF DESCRIPTION OF THE DRAWING(S)

Figure 3A:
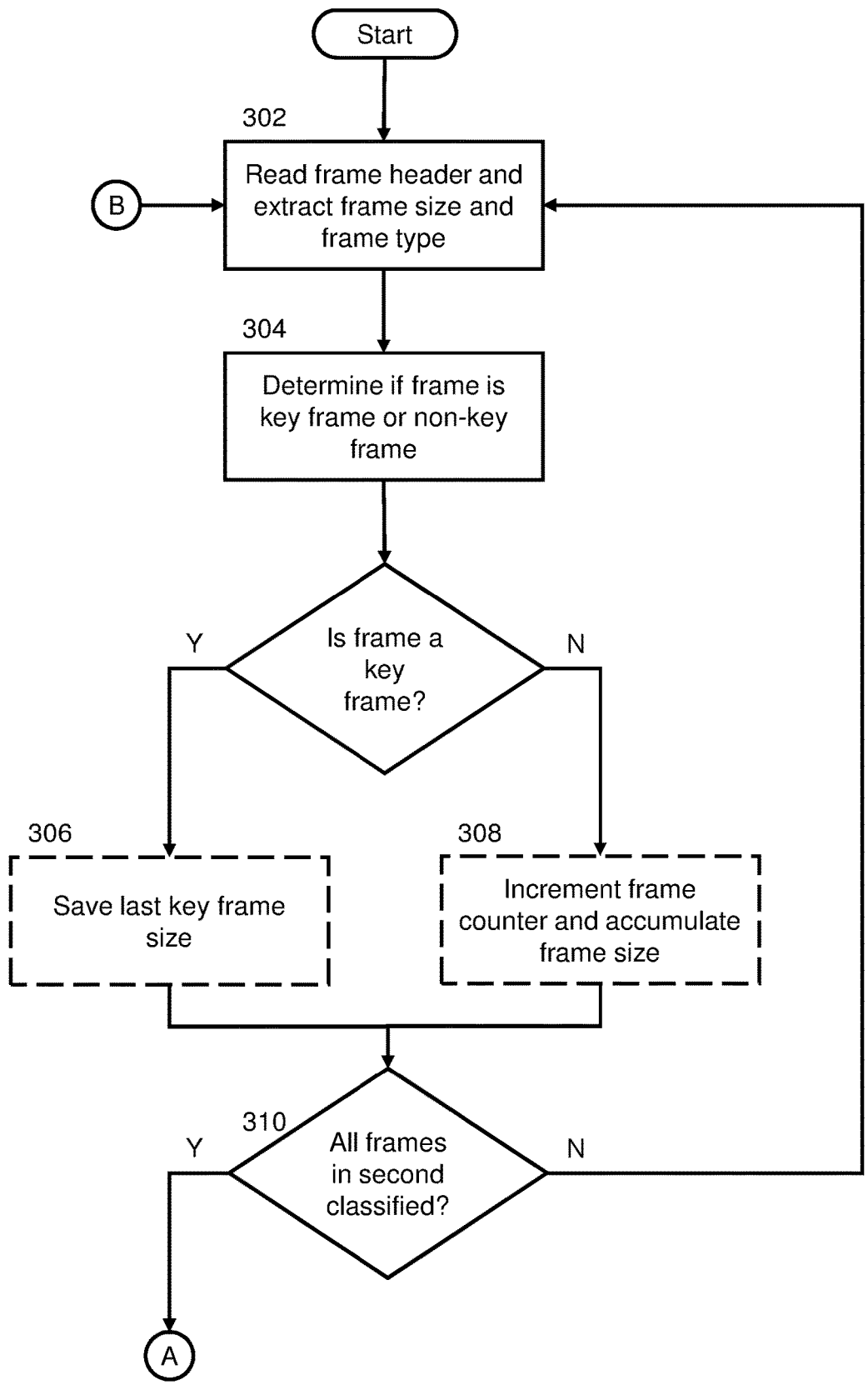
Figure 3B:
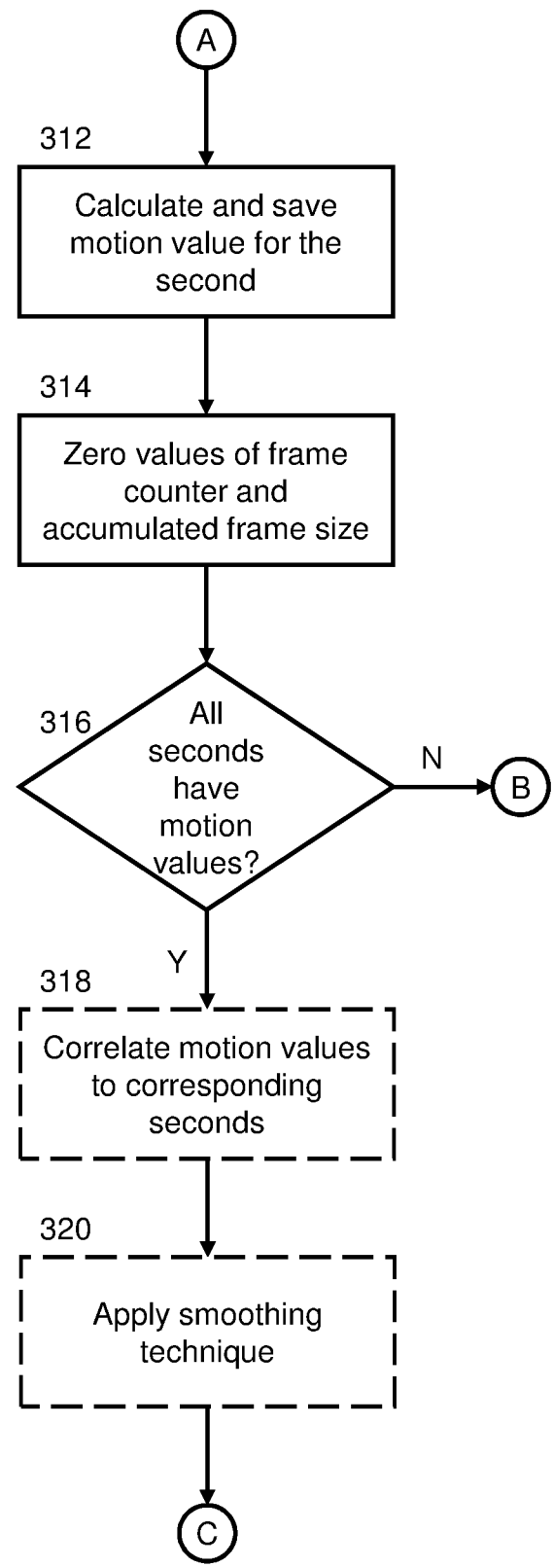

FIGS. 3a, 3b, and 3c illustrate a flow chart of an exemplary embodiment of a method for creating a timeline for a viewed video.

Figure 4:
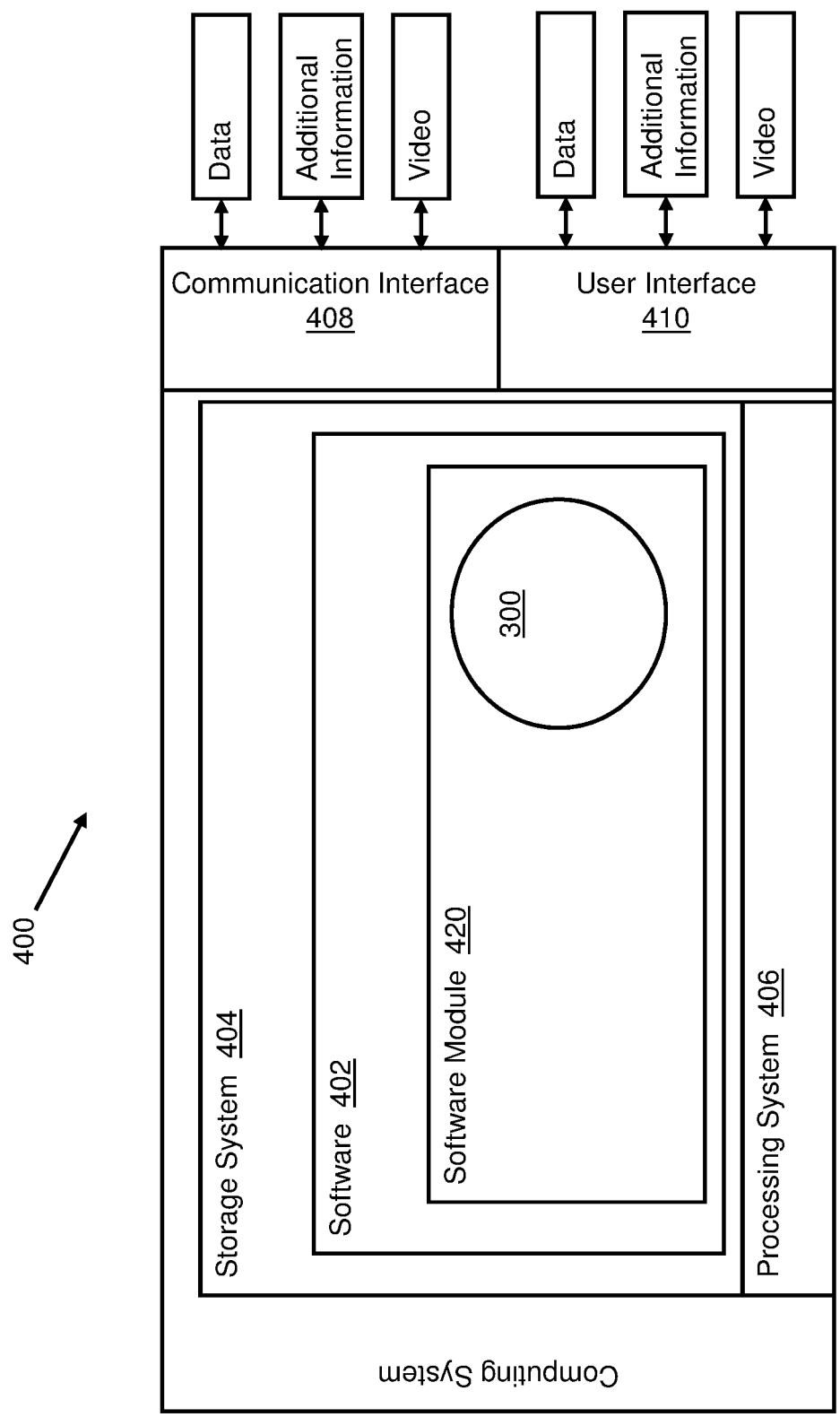

FIG. 4 illustrates a block diagram of an exemplary embodiment of a system for creating a timeline for a viewed video.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Figure 1:
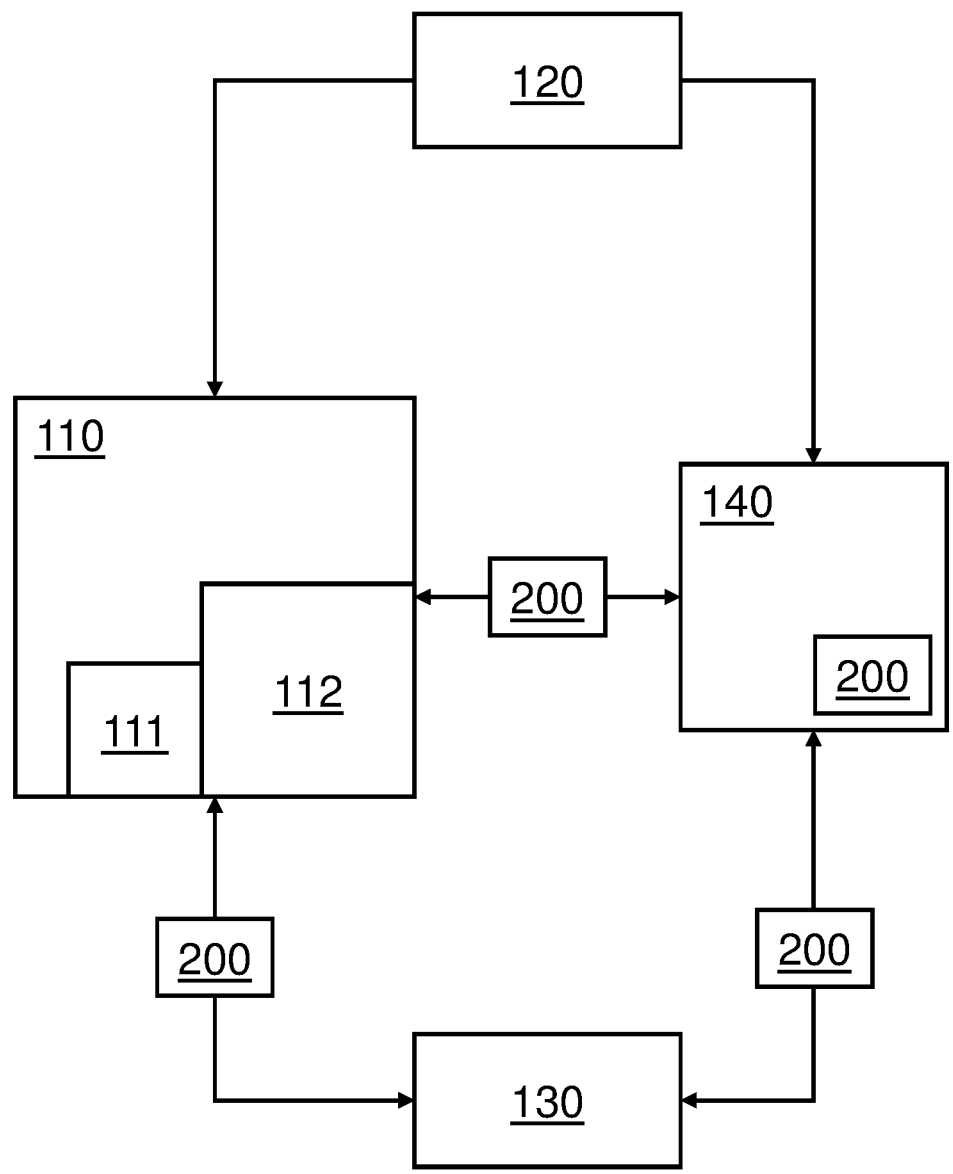
FIG. 1 illustrates a block diagram of an exemplary embodiment of a video system for creating a timeline for a viewed video.

FIG. 1 illustrates a block diagram of an exemplary embodiment of video system 100 for creating timeline 200 for a viewed video. The video system 100 includes a video analytics engine 110 which receives a video from a data input 120 and/or an external system 130 and processes the video to analyze motion in the video. The resultant output from the video analytics engine 110, such as, but not limited to, a timeline 200, may be stored and/or transmitted to the external system 130 and/or a desktop 140.

The video analytics engine 110 may comprise one or multiple video analytics engines 110 processing videos and/or other input from one or more data inputs 120 and/or external systems 130. Such input may come from a specific set of data inputs 120 and/or external systems 130 assigned to a particular video analytics engine 110. Such input may also be handled from various data inputs 120 and/or external systems 130 on an ad hoc basis. The video analytics engine 110 is configured to send, receive, and analyze videos, data, and additional information. The analysis may be a real-time analysis of streaming videos or batch analysis of videos. The video analytics engine 110 may include at least one set of video analytics rules 111 used to analyze videos and a video analytics memory 122. The video analytics rules 111 may be stored in the video analytics memory 122, along with any videos, data, additional information, or analytics results.

The video analytics rules 111 may provide guidelines for the classification and identification of video frames, provide formulas used in video analysis, and/or provide algorithms for smoothing, thresholds, and other data manipulation. The video analytics rules 111 may be static or may be dynamically updated by the video analytics engine 110, a user, and/or a third party. By way of non-limiting example, the video analytics engine 110 may utilize the video analytics rules 111 to plot correlated motion values and corresponding seconds, calculate and apply a threshold to the motion values to determine time spans of interest in the base video, correlate the time spans of interest to video, and/or extract video segments corresponding to time spans of interest.

The data input 120 is operatively connected to at least one of the video analytics engine 110 or desktop 140 to provide any data necessary for processing a video. Such data may include the video. The data input 120 may include a video camera or plurality of video cameras, a video or other data storage unit, a codec, a user interface, or input means for any other data.

Likewise, the external system 130 is operatively connected to at least one of the video analytics engine 110 or desktop 140 to provide any data necessary for processing a video, including the video. The external system 130 may also receive data, additional information, and/or the results of processing said data from the video analytics engine 110 and/or desktop 140. The external system 130 may include another video system 100, a video camera or plurality of video cameras, a video or other data storage unit, a codec, a user interface, or input means for any other data or additional information.

The desktop 140 may include an interface for receiving input from and/or communicating output to a user. The desktop 140 may receive input from a user, including a video, data, additional information, or update to video analytics rules 111, and provide output to a user, such as, but not limited to, data, additional information, a video, or an associated timeline 200.

Figure 2:
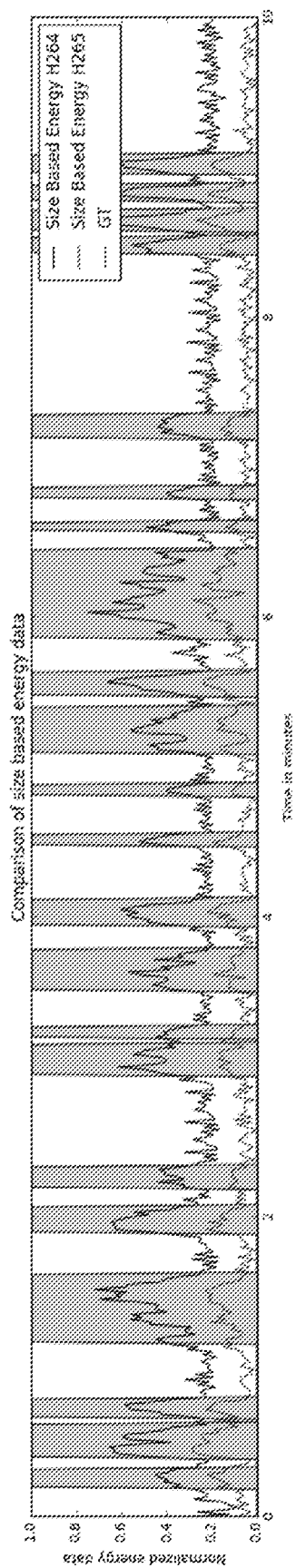
FIG. 2 illustrates a sample timeline created using the video system.

FIG. 2 illustrates a sample timeline 200 created using the video system 100. The timeline 200 is created with a motion value for each second. The timeline shows motion values for the same video using the H264 video compression codec and the H265 video compression codec, with time spans of interest visually highlighted. The GT (ground truth) areas where motion really occurred are highlighted in gray on the timeline 200. It can be seen that the GT areas overlap with the higher values of each of the motion values. As can therefore be seen from the timeline 200, even with different codecs the video system 100 can create timelines 200 with similar time spans of interest, demonstrating the versatility of the video system 100.

FIGS. 3a, 3b, and 3c illustrate a flow chart of an exemplary embodiment of the method 300 for creating a timeline for a viewed video. The method 300 is used by video system 100 to create the motion values from an input video.

As shown in FIG. 3a, in step 302, the system reads the header of a frame in the video and extracts the frame size and frame type if the frame was classified.

In step 304, the system determines if the frame is either a key frame or a non-key frame. A key frame may be a location on a timeline which marks the beginning or end of a transition in the video, a frame used to indicate the beginning or end of a change made to a parameter, representative frames of a video stream, or the frames that provide the most accurate and compact summary of the video content.

In optional step 306, if the frame is a key frame, the system stores the last key frame size.

In optional step 308, if the frame is a non-key frame, the system increments a frame counter and accumulates the frame size of the non-key frame.

In step 310, the system repeats steps 302-308 until all frames available in a second have been used. At this point, the frame counter value will be equal to the number of non-key frames, while the accumulated frame size value will be equal to the sum of the sizes of all non-key frames used.

As shown in FIG. 3b, in step 312, the system calculates the motion value for the second using the following formula:

$$\text{motion value} = \frac{\left(\frac{\text{accumulated frame size}}{\text{frame counter}}\right)}{\text{last key frame size}}$$

and stores the motion value for the second. Occasionally, frames are dropped or the frame rate may be variable. Because this method gives an average per second, the value for each second is calculated by whatever was accumulated for that second. This adds a robustness to the method 300 due to the relaxed constraint on the number of frames used for each second.

In step 314, the system zeroes the value of the frame counter and zeroes the value of the accumulated frame size.

In step 316, the system repeats steps 310-314 until all seconds in a given video segment have calculated motion values.

In optional step 318, the system correlates calculated motion values to the corresponding seconds.

In optional step 320, the system applies a smoothing technique known in the art to the calculated data. Such a smoothing technique may include, but is not limited to, an additive smoothing technique, an average-based smoothing technique, a convolution smoothing technique, an exponential smoothing technique, a filtration smoothing technique, an iterative end-point fit smoothing technique, a kernel smoothing technique, a Laplacian smoothing technique, a linear smoothing technique, a moving regression smoothing technique, a rectangular smoothing technique, a spline smoothing technique, and a stretched grid smoothing technique.

As shown in FIG. 3c, in step 322, the system creates a timeline 200. In one embodiment, the system plots the correlated motion values and corresponding seconds to produce timeline 200, as shown in FIG. 2.

In optional step 324, the system calculates at least one threshold based on data extracted from the video or calculated data. The threshold may include cutoffs for the beginning and end of at least one time span of interest in the timeline 200. Such cutoffs may be generated during step 324. If pre-designated in video analytics rules 111, the threshold may instead be updated.

In optional step 326, the system applies the threshold to the calculated data. This step may include visually highlighting the at least one time span of interest on timeline 200.

Optional steps 320 through 326 may be applied sequentially, out of order inasmuch as is possible, and/or simultaneously.

In optional step 328, the system correlates the at least one time span of interest to the video.

In optional step 330, the system extracts from the video at least one video segment corresponding to the at least one time span of interest.

In optional step 332, any video segments extracted in step 330 may be operatively linked to the timeline 200 to allow a user to play a video segment by selecting the operative link. By way of non-limiting example, the operative link may be a graphical link, such as, but not limited to, a visually highlighted time span of interest in the timeline 200 corresponding to the video segment. The user could then play the video segment by selecting the corresponding time span of interest in the timeline 200.

One novel aspect of the above method is that by normalizing the average frame size by the last key frame the method 300 obtains a measure that can be used without any prior knowledge but still indicates the motion size regardless of the frame size/frame rate or compression quality. This is very fast due to the dependency on only the frame headers and not on the decompressed data or even the information in the compressed data, such as the motion vectors.

FIG. 4 illustrates a block diagram of an exemplary embodiment of a computing system 400 for creating a timeline 200 for a viewed video. The computing system 400 may be used to implement embodiments of portions of the video system 100, or in carrying out embodiments of the method 300.

The computing system 400 is generally a computing system that includes a processing system 406, a storage system 404, software 402, a communication interface 408, and a user interface 410. The processing system 406 loads and executes software 402 from the storage system 404, including a software module 420. When executed by computing system 400, software module 420 directs the processing system 406 to operate as described in herein in further detail in accordance with the above method 300.

The computing system 400 includes a software module 420 for executing method 300 and generating timeline 200. Although computing system 400 as depicted in FIG. 4 includes one software module 420 in the present example, it should be understood that more modules could provide the same operation. Similarly, while the description as provided herein refers to a computing system 400 and a processing system 406, it is to be recognized that implementations of such systems can be performed using one or more processors, which may be communicatively connected, and such implementations are considered to be within the scope of the description. It is also contemplated that these components of computing system 400 may be operating in a number of physical locations.

The processing system 406 can comprise a microprocessor and other circuitry that retrieves and executes software 402 from storage system 404. The processing system 406 can be implemented within a single processing device but can also be distributed across multiple processing devices or sub-systems that cooperate in existing program instructions. Examples of processing systems 406 include general purpose central processing units, application specific processors, and logic devices, as well as any other type of processing device, combinations of processing devices, or variations thereof.

The storage system 404 can comprise any storage media readable by processing system 406, and capable of storing software 402. The storage system 404 can include volatile and non-volatile, removable and non-removable media implemented in any method or technology for storage of information, such as computer readable instructions, data structures, program modules, or other information. The storage system 404 can be implemented as a single storage device but may also be implemented across multiple storage devices or sub-systems. The storage system 404 can further include additional elements, such a controller capable of communicating with the processing system 406.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to computing system 400.

As described in further detail herein, computing system 400 receives and transmits data through communication interface 408. The data can include any of the above data derived from the video, any calculated data, the video itself, and/or any other data that may pertain to the creation of timeline 200. In embodiments, the communication interface 408 also operates to send and/or receive information, such as, but not limited to, additional information to/from other systems to which computing system 400 is communicatively connected, including, but not limited to, another video system 100, a video camera or plurality of video cameras, a video or other data storage unit, or a codec, input related to derived and/or calculated data, the video, and/or any additional information that may pertain to the creation of timeline 200.

The user interface 410 can include one or more of a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display one or more of the video, timeline 200, or another interface further associated with embodiments of the system and method as disclosed herein. Speakers, printers, haptic devices and other types of output devices may also be included in the user interface 410. Users or other staff can communicate with computing system 400 through the user interface 410 in order to view the video, timeline 200, and/or derived and/or calculated data, to enter or receive any other data or additional information, to update video analytics rules 111, or any number of other tasks the user or other staff may want to complete with computing system 400.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claim.

What is claimed is:

1. A method for generating a compression invariant motion timeline for a video, comprising:
repeating for each second in the video:
identifying each frame in a given second by repeating for each frame in a given second:
reading the frame header,
extracting the frame size and a frame type, and determining the frame type,
calculating and storing a motion value for the second based on the extracted frame sizes and frame types for the second; and
creating the timeline using each motion value for each second.

2. The method of claim 1, wherein the frame type is selected from the group consisting of: key frame and non-key frame.

3. The method of claim 2, the method further comprising, for each frame in the given second, storing the last frame size if the frame is a key frame.

4. The method of claim 3, the method further comprising for each frame of the given second, storing a gram counter and accumulating the size of frames if the frame is a non-key frame.

5. The method of claim 4, wherein calculating and storing the motion value for the second includes using the stored key frame size, the frame counter, and the accumulated size of frames.

6. The method of claim 1, the method further comprising correlating the motions values to the corresponding seconds.

7. The method of claim 6, further comprising creating the timeline by plotting the correlated motion values and corresponding seconds to produce the timeline.

8. A system for generating a compression invariant motion timeline for a video, comprising:
a processor; and
a non-transitory computer readable medium programmed with computer readable code that upon execution by the processor causes the processor to execute a method for generating a compression invariant motion timeline for a video, comprising:
repeating for each second in the video:
identifying each frame in a given second by repeating for each frame in a given second:
reading the frame header,
extracting the frame size and a frame type, and determining the frame type,
calculating and storing a motion value for the second based on the extracted frame sizes and frame types for the second; and
creating the timeline using each motion value for each second.

9. The system of claim 8, wherein the frame type is selected from the group consisting of: key frame and non-key frame.

10. The system of claim 9, the method for generating the compression invariant motion timeline for the video further includes, for each frame in the given second, storing the last frame size if the frame is a key frame.

11. The system of claim 10, the method for generating the compression invariant motion timeline for the video further includes, for each frame of the given second, storing a gram counter and accumulating the size of frames if the frame is a non-key frame.

12. The system of claim 11, wherein calculating and storing the motion value for the second includes using the stored key frame size, the frame counter, and the accumulated size of frames.

13. The system of claim 8, wherein the processor is operatively coupled to at least one video camera, at least on data storage unit, or at least one codec.

14. The system of claim 8, wherein the process or receives the video from one of at least one video camera, at least one data storage unit, or at least one codec.

15. A non-transitory computer readable medium programmed with computer readable code that upon execution by a processor causes the processor to execute a method for generating a compression invariant motion timeline for a video, comprising:
repeating for each second in the video:
identifying each frame in a given second by repeating for each frame in a given second:
reading the frame header,
extracting the frame size and a frame type, and determining the frame type,
calculating and storing a motion value for the second based on the extracted frame sizes and frame types for the second; and
creating the timeline using each motion value for each second.

16. The non-transitory computer readable medium of claim 15, wherein the frame type is selected from the group consisting of: key frame and non-key frame.

17. The non-transitory computer readable medium of claim 16, the method for generating the compression invariant motion timeline for the video further includes, for each frame in the given second, storing the last frame size if the frame is a key frame.

18. The non-transitory computer readable medium of claim 17, the method for generating the compression invariant motion timeline for the video further includes, for each frame of the given second, storing a gram counter and accumulating the size of frames if the frame is a non-key frame.

19. The non-transitory computer readable medium of claim 18, wherein calculating and storing the motion value for the second includes using the stored key frame size, the frame counter, and the accumulated size of frames.

20. The non-transitory computer readable medium of claim 15, the method for generating the compression invariant motion timeline for the video further includes correlating the motions values to the corresponding seconds.

* * * * *